United States Patent [19]

Guarino et al.

[11] 4,360,551
[45] Nov. 23, 1982

[54] FLEXIBLE FILM LAMINATE ESPECIALLY ADAPTED FOR USE IN THE CONSTRUCTION OF A RETORTABLE FOOD POUCH

[75] Inventors: John P. Guarino, Lawrenceville; Frederick C. Schwab, Metuchen, both of N.J.

[73] Assignee: Mobil Oil Corporation, New York, N.Y.

[21] Appl. No.: 275,178

[22] Filed: Jun. 19, 1981

[51] Int. Cl.³ .................... B65D 65/40; B32B 27/06
[52] U.S. Cl. ................................. 428/35; 428/215; 428/461; 428/516; 428/520; 426/126; 426/127; 264/176 R
[58] Field of Search ................ 428/35, 215, 461, 516, 428/520

[56] References Cited

U.S. PATENT DOCUMENTS

| | | |
|---|---|---|
| 2,200,429 | 5/1940 | Perrin et al. |
| 2,632,921 | 3/1953 | Kreidl |
| 2,648,097 | 8/1953 | Kritchever |
| 2,661,378 | 12/1953 | Heller |
| 2,994,632 | 8/1961 | Brown et al. |
| 2,999,782 | 9/1961 | Justice et al. |
| 3,018,189 | 1/1962 | Traver |
| 3,049,455 | 8/1962 | Werkman et al. |
| 3,179,554 | 4/1965 | Gladding et al. |
| 3,453,173 | 7/1969 | Isley et al. |
| 3,682,693 | 8/1972 | Khelghatian et al. ............ 428/461 |
| 4,066,731 | 1/1978 | Hungerford |
| 4,211,811 | 7/1980 | Bordini et al. |
| 4,291,085 | 9/1981 | Ito et al. ............................ 428/35 |

FOREIGN PATENT DOCUMENTS 834196 12/1958 United Kingdom.
886680 1/1962 United Kingdom.

*Primary Examiner*—P. Ives
*Attorney, Agent, or Firm*—Charles A. Huggett; Michael G. Gilman; Edward F. Kenehan, Jr.

[57] ABSTRACT

A flexible film laminate especially adapted for use in the manufacture of a retortable pouch for the packaging of food is disclosed which comprises:
(a) a first layer of heat-sealable polyolefin;
(b) a second layer of previously metallized thermoplastic polymer bonded to said first layer; and,
(c) an adhesive bonding the first layer to the metallized surface of the second layer, said adhesive being a maleic acid anhydride adduct of ethylene-propylene copolymer.

28 Claims, No Drawings

FLEXIBLE FILM LAMINATE ESPECIALLY ADAPTED FOR USE IN THE CONSTRUCTION OF A RETORTABLE FOOD POUCH

BACKGROUND OF THE INVENTION

This invention relates to flexible film laminates and retortable food pouches fabricated therefrom.

In recent years, the food packaging industry has shown intense interest in the concept of pouch-packed foods which, among other advantages, do not require freezing for their preservation and can therefore dispense with costly and energy intensive refrigerated transportation and storage facilities. Much effort has gone into the development of a flexible retortable, or autoclavable, food pouch which cannot only withstand the rigors of sterilization and later reheating and provide barrier properties which are sufficient to adequately protect the contents during storage, but which employs materials that are toxicologically safe. The latter requirement necessarily narrows the range of useful materials, especially with regard to the adhesive used in laminating the layers of the pouch. The U.S. Food and Drug Administration (FDA) and its counterpart agencies around the world have established maximum levels of extractables which cannot be exceeded if a particular laminate is to be cleared for use in food packaging.

Among the various materials which have been investigated for use in the manufacture of the food pouch laminate layers are polyester, polyamide, polyolefin, especially polypropylene, ionomer resin, aluminum, and the like. Adhesives which have been studied for bonding the layers to each other include polyurethane, epoxy resin, ethylene-vinyl acetate copolymer and the maleic anhydride adduct of ethylene-propylene copolymer one of which, Morprime 78LJ10 (Morton Chemical, Division of Morton Norwich Products, Inc.), has been cleared for use in food packaging by the FDA and is commercially available.

In accordance with U.S. Pat. No. 3,453,173, a polyolefin-polyacrylonitrile laminate which is said to possess superior heat-seal strength and excellent barrier properties to the transmission of gases and is adaptable for the construction of food containers is prepared by bringing the polyolefin surface and the polyacrylonitrile surface together and adhering the adjacent surfaces to each other through an adhesive. Either or both surfaces can be pretreated in some manner to make them more adherent, e.g., by treatment with a gaseous mixture of boron trifluoride as described in British Pat. No. 834,196, by flame treatment and treatment by corona discharge as described in U.S. Pat. Nos. 2,632,921, 2,648,097 and 3,018,189 and British Pat. No. 986,680, or by treatment with a strong oxidant such as nitric acid. Among the adhesives employed in the manufacture of the laminate are ethylene-vinyl acetate copolymer described in U.S. Pat. No. 2,200,429, the rubber solutions described in U.S. Pat. No. 2,664,378 or the adhesive materials described in U.S. Pat. Nos. 2,994,632, 2,999,782, 3,049,455 and 3,179,554. While the laminate of U.S. Pat. No. 3,453,173 possesses properties which tend to make it a particularly worthwhile candidate for use in the construction of a food pouch, it has been observed that no, or at most very little, bonding of the polyolefin layer to the polyacrylonitrile layer is obtained with the FDA-approved resin Morprime 78 LJ 10 as the adhesive.

Another type of packaging laminate is described in U.S. Pat. No. 4,211,811 in which the surface of one or two stretched films made from substantially crystalline polyolefin is provided, on its surface in contact with the other film, with a metallized coating having a resistivity between 1 and 5 ohms. Metallization is carried out under vacuum using metals such as aluminum, which is preferred for its low cost, zinc, gold, palladium and cadmium, preferably on a film which has been previously subjected to treatment with a continuous, non-disrupting electric or corona discharge. The bonded sheets are generally prepared by lamination of the two films to each other, with or without interposed adhesives, by causing the films to pass between heated rollers. Adhesives, when used, can be applied to the face of one of the films in the form of an organic solvent solution or aqueous dispersion. Adhesives said to be especially useful are thermoplastic resins such as cellulose esters and ethers, alkyl and acrylic esters, polyamides, polyurethanes, polyesters; or thermosetting resins such as epoxy resins, urea/formaldehyde, phenol/formaldehyde, melamine/formaldehyde; or synthetic rubbers.

SUMMARY OF THE INVENTION

In accordance with the present invention, a flexible film laminate adaptable for use in the manufacture of a retortable pouch for the packaging of food is provided which comprises:

(a) a first layer of heat-sealable polyolefin;

(b) a second layer of previously metallized thermoplastic polymer bonded to said first layer; and, (c) an adhesive bonding the first layer to the metallized surface of the second layer, said adhesive being a maleic acid anhydride adduct of ethylene-propylene copolymer.

Metallization of the second layer prior to forming the laminate is indispensable if a laminate having a bond strength capable of withstanding thermal processing without delamination (e.g., 250° F. for 30 minutes minimum) is to be obtained.

DESCRIPTION OF THE PREFERRED EMBODIMENTS

The polyolefins which are useful herein include the film-forming homopolymers and copolymers formed by the polymerization of one or more alpha-olefins of the structure

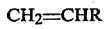

$$CH_2=CHR$$

wherein R is hydrogen or an alkyl group of from 1 to 8 carbon atoms, e.g., ethylene, propylene, butene-1, pentene-1, hexene-1, heptene-1, octene-1, and so forth. The useful polyolefins also include film-forming copolymers of one or more of the aforesaid alpha-olefins copolymerized with up to about 20 weight percent total, and preferably not more than about 5 weight percent total, of one or more other monomers copolymerizable with alpha-olefin, e.g., carbon monoxide; sulfur dioxide; acrylic acid or an acrylate ester such as methyl acrylate, amyl acrylate, hexyl acrylate, cyclohexyl acrylate, phenyl acrylate, octyl acrylate, allyl acrylate, methallyl acrylate, tetramethylene diacrylate, glyceryl triacrylate, sucrose hexaacrylate, and the like; methacrylic acid or a methacrylate ester such as methyl methacrylate, ethyl methacrylate, propyl methacrylate, butyl methacrylate, amyl methacrylate, phenyl methacrylate, decyl methacrylate, allyl methacrylate, ethylene glycol dimethacrylate, 1,1,1-trimethoxypropanedimethacrylate, ethylidene dimethacrylate, methylene dimethacrylate, and the like; vinyl acetic acid or a vinyl ester such as vinyl formate, vinyl acetate, vinyl propionate, vinyl butyrate, vinyl benzoate, isopropenyl acetate, and the like; a vinyl aromatic such as styrene, alpha-methyl styrene, vinyl toluene, vinyl xylene, vinyl naphthalenes, divinyl benzene, divinyl biphenyl, divinyl naphthalene, trivinyl benzene, and the like; a vinyl amide or other ethylenically unsaturated amide such as acrylamide, methacrylamide, N-methyl acrylamide, vinyl benzamide, N-vinyl pyrrolidone, methylene-bis-acrylamide, ethylenediacrylamide, N-allyl acrylamide, N,N-diallyl acrylamide, N,N-dimethylallyl methacrylamide, and the like; a vinyl halide such as vinyl chloride, vinyl bromide, vinyl fluoride, vinylidene chloride, vinylidene fluoride, dichlorodifluoroethylene, tetrafluoroethylene, and the like; ethylenically unsaturated polycarboxylic acid such as maleic acid, fumaric acid, itaconic acid, their anhydrides, aconitic acid and esters thereof such as diethyl maleate, diallyl maleate, ethylene glycol dimaleate, diethyl fumarate, diallyl fumarate, ethylene glycol difumarate, diethyl itaconate, diallyl itaconate, ethylene glycol diitaconate, triallyl aconitate, and the like; vinyl and allyl ethers such as methyl vinyl ether, ethylvinyl ether, divinyl ether, the divinyl ether of butanediol-1,4-diallyl ether, dimethylallyl ether; other allylic compounds including diallyl phthalate, triallyl cyanurate, diallyl benzene, allyl allyloxyacetate, diallyl malamine, diallyl isomelamine, triallyl melamine, triallyl phosphate tetrallyl silane, diallyl divinyl silane, tetrallyl germane, tetrallyl pentaerythritol, hexaallyl sucrose, hexaallyl inositol, hexaallyl sorbitol; and, a diolefin such as butadiene, 1,4-pentadiene, 1,5-hexadiene, 1,6-heptadiene, 1,7-octadiene, and the like. Procedures for the polymerization of alpha-olefins and the copolymerization of alpha-olefins with other monomers such as those recited herein and the formation of the resin films are well known and do not per se constitute a part of this invention. The polyolefins which are useful herein can be atactic, isotactic, syndiotactic, crystalline and amorphous or a combination of any of the foregoing. The preferred polyolefin films are the homopolymers and copolymers of ethylene and propylene. If desired, the polyolefin film can be subjected to treatment by electric or corona discharge and/or by other means, e.g., treatment by flame, by exposure to a gaseous mixture of boron trifluoride and an oxidizing agent, by exposure to a strong oxidant such as nitric acid or by any combination of the foregoing in accordance with known procedures, for the purpose of providing a stronger bond between the films comprising the finished laminate.

The second resin layer herein will ordinarily be selected from thermoplastic materials possessing a low oxygen transmission rate and a low moisture vapor transmission rate (MVTR). Thus, for example, the resin constituting the second layer preferably possesses an oxygen permeability rate of less than about 10 cc/100 in$^2$/24 hr/atm at 100° F., more preferably, less than about 1.0 cc/11 in$^2$/24 hr/atm at 23° C., and an MVTR preferably less than about 50 cc/100 in$^2$/24 hr at 100° F. and 90% relative humidity, more preferably less than about 10 cc/100 in$^2$/24 hr at 100° F. With these desiderata in mind numerous resins including polyacrylonitrile, polyamide, ionomer resin, and the like, can be selected for use as the second layer of the laminate herein.

The aforesaid oxygen and water vapor transmission rates can be determined by various methods known in the art. For example, oxygen transmission rates can conveniently be measured with a Dobrmann Polymeric Permeation Analyzer, PPA-1 (Dohrmann Envirotech Corporation, Mountain View, Calif.). The Dow Cell can also be employed for this purpose, in accordance with ASTM procedure D-1434. The water or moisture vapor transmission rates (MVTR) can be determined in a Honeymoon Model W 825 Water Vapor Transmission Rate Tester (Honeywell, Inc., Minneapolis, Minn.).

Polyacrylonitrile possesses excellent properties for this application and as such is preferred. The polyacrylonitrile film can be prepared from a resin containing up to about 20 weight percent total, and preferably not more than about 5 weight percent total, of one or more other monomers copolymerizable with acrylonitrile such as any of the alpha-olefins and other monomers recited above employing any of several known and conventional procedures. It is preferred to use an acrylonitrile homopolymer film prepared by the polymerization and film formation methods described in U.S. Pat. No. 4,006,731 to Hungerford (Mobil Oil Corporation) which is incorporated by reference herein.

Any of the foregoing film-forming polymers can be blended with varying quantities, in some cases up to half the total weight of resin thereof, with one or more other polymers which are either compatible therewith or which have been rendered compatible with said film-forming polymers in accordance with established procedures. Thus, for example, the polyolefin film can be prepared from a blend of from about 80 weight percent polypropylene with from about 20 weight percent polyethylene. The polymers herein can also contain other ingredients such as processing aids, plasticizers, antioxidants, reinforcements, fillers, pigments, etc., in the customary amounts.

Prior to bonding, the surface of the second resin layer which is to be placed in adherent contact with the polyolefin layer is metallized, e.g., as in the manner described in U.S. Pat. No. 4,211,811 to Bordini, et al. which is incorporated by reference herein, i.e., under vacuum using metals such as aluminum, zinc, gold, palladium, cadmium, optionally upon a film which has been subjected to a continuous, non-perforating electric discharge. Metallization with aluminum is preferred due to the relatively low cost of this metal and its long-accepted use in food packaging. Metallized coatings having a resistivity between about 1 and about 10 ohms generally provide good results.

The maleic anhydride adduct of ethylene-propylene copolymer which is used herein as the adhesive, preferably the FDA-approved adhesive Morprime 78LJ10 (Morton Chemical, division of Morton Norwich Products, Inc.) is applied to one film face, e.g., by extrusion coating from the melt. The adhesive can be supplied in the form of an organic solvent solution or aqueous dispersion. Solutions/dispersions having an adhesive concentration of from about 5 to about 40% by weight are advantageously employed, e.g., in an amount sufficient to provide from 1 to 10 g/m$^2$ of film surface.

The individual films comprising the laminate herein can be prepared in widely varying thicknesses, for example, from about 0.1 mils to about 10 mils and preferably from about 0.5 mils to about 5 mils. The films can be assembled into the laminate employing any one or more of several conventional procedures such as those described in U.S. Pat. No. 3,453,173 to Isley, et al. which is incorporated by reference herein. Thus, for example, the films, following metallization and adhesive application can be brought together and passed through a set of rollers which press the superimposed films together.

The laminates of this invention can be fabricated into retortable pouches employing known methods. In accordance with one such procedure, two superimposed layers of laminate with the heat-sealable polyolefin sides facing each other can be edge-sealed between heated plates.

The following example is further illustrative of the invention.

EXAMPLE

A sheet of polyacrylonitrile film having a thickness of approximately 0.7 mils was metallized with aluminum to provide an aluminum coating thereon having a resistivity of about 4 ohms. Following metallization, Morprime 78LJ10 a 15 weight percent dispersion of a maleic anhydride adduct of ethylene/propylene copolymer in high boiling aliphatic hydrocarbons, was applied to the metallized surface of the polyacrylonitrile film and dried for 5 minutes at 120° C. Thereafter, a sheet of polypropylene film which had been treated by corona discharge was applied to the adhesive side of the polyacrylonitrile film in a press at 300° F. for 3-5 minutes and 10,000 psi load. The bond between the polyacrylonitrile and polypropylene layers was excellent.

When substantially the same procedure was used without metallizing, no appreciable bond between the two films was obtained.

What is claimed is:

1. A flexible film laminate which comprises:
   (a) a first layer of heat-sealable polyolefin;
   (b) a second layer of previously metallized thermoplastic polyacrylonitrile polymer bonded to said first layer; and,
   (c) an adhesive bonding the first layer to the metallized surface of the second layer, said adhesive being a maleic acid anhydride adduct of ethylene-propylene copolymer.

2. The flexible film laminate of claim 1 in which the polyolefin layer (a) is a homopolymer or a copolymer of alpha-olefin of the structure $$CH_2=CHR$$

wherein R is H or an alkyl group of from 1 to about 10 carbon atoms.

3. The flexible film laminate of claim 2 in which the polyolefin layer (a) contains up to about 20 weight percent total of one or more other monomers copolymerizable with alpha-olefin.

4. The flexible film laminate of claim 3 in which the polyolefin layer (a) contains not more than about 5 weight percent total of one or more other monomers copolymerizable with alpha-olefin.

5. The flexible film laminate of claim 2 in which the polyolefin layer (a) is a homopolymer of ethylene or propylene or a copolymer of ethylene and propylene.

6. The flexible film laminate of claim 1 in which polymer layer (b) is metallized with aluminum to a resistivity between about 1 to about 10 ohms.

7. The flexible film laminate of claim 1 in which polymer layer (b) possesses an oxygen permeability rate of less than about 10 cc/100 in²/24 hr/atm at 100° F.

8. The flexible film laminate of claim 7 in which polymer film (b) possesses an oxygen permeability rate of less than about 1.0 cc/100 in²/24 hr/atm at 100° F.

9. The flexible film laminate of claim 1 in which film (b) possesses an MVTR less than about 50 cc/100 in²/24 hr at 100° F. and 90% relative humidity.

10. The flexible film laminate of claim 9 in which film (b) possesses an MVTR less than about 10 cc/100 in²/24 hr at 100° F. and 90% relative humidity.

11. The flexible film laminate of claim 1 in which the polyacrylonitrile contains up to about 20 weight percent total of one or more other monomers copolymerizable with acrylonitrile.

12. The flexible film laminate of claim 11 in which the polyacrylonitrile contains not more than about 5 weight percent total of one or more other monomers copolymerizable with acrylonitrile.

13. The flexible film laminate of claim 1 wherein each film possesses a thickness of from about 0.1 mils to about 10 mils.

14. The flexible film laminate of claim 11 wherein each film possesses a thickness of from about 0.5 to about 5 mils.

15. A retortable food pouch fabricated from a flexible film laminate which comprises:
   (a) a first layer of heat-sealable polyolefin;
   (b) a second layer of previously metallized thermoplastic polyacrylonitrile polymer bonded to said first layer; and,
   (c) an adhesive bonding the first layer to the metallized surface of the second layer, said adhesive being a maleic acid anhydride adduct of ethylene-propylene copolymer.

16. The retortable food pouch of claim 15 in which the polyolefin layer (a) is a homopolymer or a copolymer of alpha-olefin of the structure $$CH_2=CHR$$

wherein R is H or an alkyl group of from 1 to about 10 carbon atoms.

17. The retortable food pouch of claim 16 in which the polyolefin layer (a) contains up to about 20 weight percent total of one or more other monomers copolymerizable with alpha-olefin.

18. The retortable food pouch of claim 17 in which the polyolefin layer (a) contains not more than about 5 weight percent total of one or more other monomers copolymerizable with alpha-olefin.

19. The retortable food pouch of claim 16 in which the polyolefin layer (a) is a homopolymer of ethylene or propylene or a copolymer of ethylene and propylene.

20. The retortable food pouch of claim 15 in which polymeric layer (b) is metallized with aluminum to a resistivity between about 1 to about 10 ohms.

21. The retortable food pouch of claim 15 in which polymer layer (b) possesses an oxygen permeability rate of less than about 10 cc/100 in²/24 hr/atm at 100° F.

22. The retortable food pouch of claim 21 in which polymer film (b) possesses an oxygen permeability rate of less than about 1.0 cc/100 in²/24 hr/atm at 100° F.

23. The retortable food pouch of claim 15 in which film (b) possesses an MVTR less than about 50 cc/100 in²/24 hr at 100° F. and 90% relative humidity.

24. The retortable food pouch of claim 23 in which film (b) possesses an MVTR less than about 10 cc/100 in²/24 hr at 100° F. and 90% relative humidity.

25. The retortable food pouch of claim 15 in which the polyacrylonitrile contains up to about 20 weight percent total of one or more other monomers copolymerizable with acrylonitrile.

26. The retortable food pouch of claim 25 in which the polyacrylonitrile contains not more than about 5 weight percent total of one or more other monomers copolymerizable with acrylonitrile.

27. The retortable food pouch of claim 15 wherein each film possesses a thickness of from about 0.1 mils to about 10 mils.

28. The retortable food pouch of claim 27 wherein each film possesses a thickness of from about 0.5 to about 5 mils.

* * * * *